(12) United States Patent
Weng et al.

(10) Patent No.: US 9,093,897 B1
(45) Date of Patent: Jul. 28, 2015

(54) INVERTER AND CONTROL METHOD THEREOF

(71) Applicant: Delta Electronics (Shanghai) Co., Ltd., Shanghai (CN)

(72) Inventors: Bing-Wen Weng, Shanghai (CN); Xuan-Cai Zhu, Shanghai (CN); Ke-Rou Wang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 14/580,170

(22) Filed: Dec. 22, 2014

(30) Foreign Application Priority Data

Jan. 28, 2014 (CN) .......................... 2014 1 0042042

(51) Int. Cl.
*H02M 7/5387* (2007.01)
*H02M 1/088* (2006.01)
*H02M 1/00* (2007.01)

(52) U.S. Cl.
CPC ............ *H02M 1/088* (2013.01); *H02M 7/5387* (2013.01); *H02M 2001/0003* (2013.01)

(58) Field of Classification Search
USPC .......................... 363/15–17, 97–98, 131–132
See application file for complete search history.

(56) References Cited

U.S. PATENT DOCUMENTS

| | | | |
|---|---|---|---|
| 5,877,951 A * | 3/1999 | Mweene | 363/98 |
| 2009/0016089 A1* | 1/2009 | Nguyen | 363/125 |
| 2011/0019453 A1* | 1/2011 | Gonzalez Senosiain et al. | 363/131 |
| 2013/0200715 A1* | 8/2013 | Pettersson et al. | 307/82 |
| 2015/0036403 A1* | 2/2015 | Yu et al. | 363/132 |

FOREIGN PATENT DOCUMENTS

| | | |
|---|---|---|
| CN | 101931337 A | 12/2010 |
| CN | 102684523 A | 9/2012 |
| TW | 201304385 A1 | 1/2013 |
| TW | 201320577 A1 | 5/2013 |

* cited by examiner

*Primary Examiner* — Adolf Berhane
*Assistant Examiner* — Henry Lee, III
(74) *Attorney, Agent, or Firm* — CKC & Partners Co., Ltd.

(57) ABSTRACT

The present invention discloses an inverter and a control method thereof. The inverter includes a first bridge leg having a series of first switch, second switch, third switch, fourth switch and fifth switch, and a second first bridge leg having a series of sixth switch, seventh switch, eighth switch, ninth switch, tenth switch. The control method includes steps of synchronously turning on or off the first switch, second switch, ninth switch and tenth switch, controlling that an on/off state of the third switch or eighth switch is complementary to an on/off state of the first switch, second switch, ninth switch and tenth switch, and synchronously turning on or off the fourth switch, fifth switch, sixth switch and seventh switch.

21 Claims, 6 Drawing Sheets

INVERTER AND CONTROL METHOD THEREOF

RELATED APPLICATIONS

This application claims priority to Chinese Application Serial Number 201410042042.1, filed Jan. 28, 2014, which is herein incorporated by reference.

BACKGROUND

1. Field of Invention

The present invention relates to power converter circuit. More particularly, the present invention relates to an inverter and control methods thereof.

2. Description of Related Art

An Inverter is a power converter circuit which converts direct current (DC) power to alternating current (AC). In the photovoltaic application, the solar inverter is widely used for converting the DC power from solar arrays into AC and delivering to the grid.

The transformer-less inverter which has no isolation transformer is widely used in photovoltaic applications because of its high efficiency, low cost and light weight. With the transformer-less solar inverter, the common mode voltage, which is generated by the inverter, will cause leakage current through to the parasitic capacitance of the photovoltaic arrays. And it will affect the life of the array and user safety.

SUMMARY

The following presents a simplified summary of the disclosure in order to provide a basic understanding to the reader. This summary is not an extensive overview of the disclosure and it does not identify key/critical components of the present invention or delineate the scope of the present invention. The only purpose is to present some concepts disclosed herein in a simplified form as a prelude to the more detailed description that is presented later.

In one aspect, the present disclosure provides an inverter with transformer-less structure and control method thereof to improve the efficiency.

In one embodiment, an inverter includes a first bridge leg, a second bridge leg, a first diode, a second diode, a third diode, a fourth diode, a fifth diode and a sixth diode. The first bridge leg is electrically connected to a direct-current (DC) source, and the first bridge leg includes a first switch, a second switch, a third switch and a fourth switch and a fifth switch which are sequentially connected in series. The second bridge leg is connected to the first bridge leg in parallel, and the second bridge leg includes a sixth switch, a seventh switch, an eighth switch, a ninth switch and a tenth switch which are sequentially connected in series. The first diode is connected in anti-parallel with the first switch and the second switch which are connected in series. The second diode is connected in anti-parallel with the fourth switch and the fifth switch which are connected in series. The third diode is connected in anti-parallel with the sixth switch and the seventh switch which are connected in series. The fourth diode is connected in anti-parallel with the ninth switch and the tenth switch which are connected in series. The cathode of a fifth diode is connected to a connection point between the second switch and the third switch, and an anode of the fifth diode is connected to a connection point between the eighth switch and the ninth switch. The cathode of a sixth diode is connected to a connection point between the seventh switch and the eighth switch, and an anode of the sixth diode is connected to a connection point between the third switch and the fourth switch.

In one embodiment, the widely used unipolar modulation can be used for the presented inverter. A control method of controlling aforesaid inverter includes following steps: synchronously turning on or off the first switch, the second switch, the ninth switch and the tenth switch, and controlling that the eighth switch is turning on or off in complementary with the first switch, the second switch, the ninth switch and the tenth switch; synchronously turning on or off the fourth switch, the fifth switch, the sixth switch and the seventh switch; controlling that the third switch is turning on or off in complementary with the fourth switch, the fifth switch, the sixth switch and the seventh switch. Alternatively, the control method includes following steps: synchronously turning on or off the first switch, the second switch, the ninth switch and the tenth switch, and controlling that the third switch is turning on or off in complementary with the first switch, the second switch, the ninth switch and the tenth switch; synchronously turning on or off the fourth switch, the fifth switch, the sixth switch and the seventh switch; controlling that the eighth switch is turning on or off in complementary with the fourth switch, the fifth switch, the sixth switch and the seventh switch.

Compared to existing techniques, the technical solutions of the present disclosure can provide significant advantages and beneficial effects. For the photovoltaic application, the present invention provides the inverter which has low common mode noise and high efficiency and also reactive power output capability. The inverter is suit for grid-connected photovoltaic systems that have no isolation transformer or other applications.

To provide better understanding, the detailed description together with drawings is presented as following.

BRIEF DESCRIPTION OF THE DRAWINGS

The detailed description and accompanying drawing are given as below to provide better understanding, wherein.

DETAILED DESCRIPTION

Figure 1:
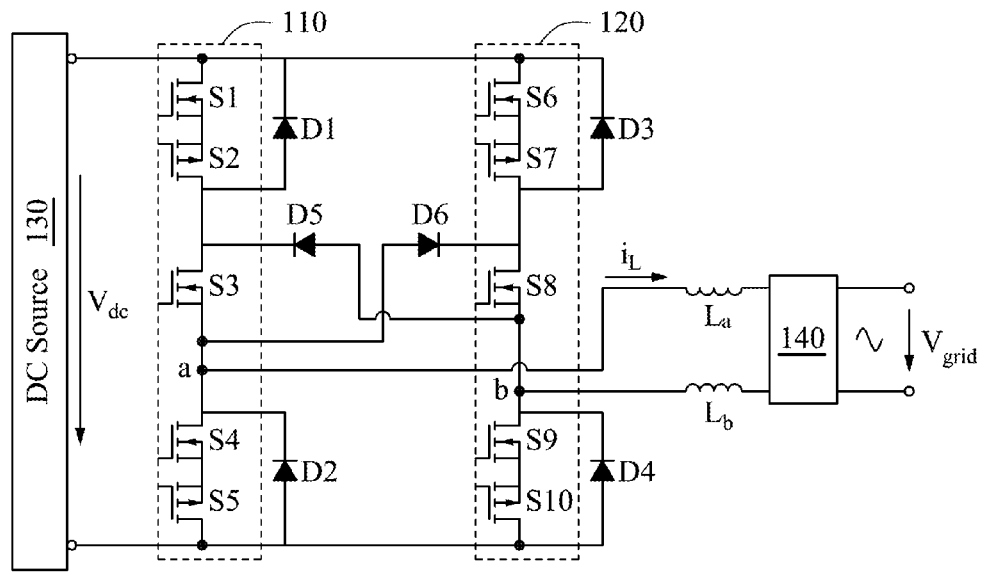
FIG. 1 is a schematic diagram of an inverter according to one embodiment of the present disclosure.

The embodiments can be fulfilled as the detailed description and figures as below. In these figures the various described features/elements are not drawn to scale but instead of best illustrate specific features/elements relevant to the present invention. Moreover, well-known structures and devices are schematically shown in order to simplify the drawing and avoid unnecessary limitation to the claimed invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used in the description herein and throughout the claims that follow, the meaning of "a", "an", and "the" includes reference to the plural unless the context clearly dictates otherwise.

FIG. 1 is a circuit diagram of an inverter 100 according to one embodiment of the present disclosure. As illustrated in FIG. 1, the inverter 100 includes a first bridge leg 110, a second bridge leg 120, a first diode (D1), a second diode (D2), a third diode (D3), a fourth diode (D4), a fifth diode (D5) and a sixth diode (D6). For example, the DC source 130 may be a photovoltaic array, a storage battery, etc.

In FIG. 1, the first bridge leg 110 is electrically connected to a direct-current (DC) source, the first bridge leg 110 includes a first switch (S1), a second switch (S2), a third switch (S3) and a fourth switch (S4) and a fifth switch (S5) which are sequentially connected in series, wherein the connection point between the third switch (S3) and the fourth switch (S4) serves as a first common coupling point (a). The second bridge leg 120 is connected to the first bridge leg 110 in parallel, the second bridge leg 120 includes a sixth switch (S6), a seventh switch (S7), an eighth switch (S8), a ninth switch (S9) and a tenth switch (S10) which are sequentially connected in series, wherein the connection point between the eighth switch (S8) and the ninth switch (S9) serves as a second common coupling point (b). The first diode (D1) is connected in anti-parallel with the first switch (S1) and second switch (S2) which are connected in series; the second diode (D2) is connected in anti-parallel with the fourth switch (S4) and the fifth switch (S5) which are connected in series; the third diode (D3) is connected in anti-parallel with the sixth switch (S6) and the seventh switch (S7) which are connected in series; the fourth diode (D4) is connected in anti-parallel with the ninth switch (S9) and tenth switch (S10) which are connected in series. The cathode of the fifth diode (D5) is connected to a connection point between the second switch (S2) and third switch (S3) and the anode of the fifth diode (D5) is connected to a second common coupling point (b) of the second bridge leg 120. The cathode of the sixth diode (D6) is connected to a connection point between the seventh switch (S7) and eighth switch (S8) and the anode of the sixth diode (D6) is connected to a first common coupling point (a) of the first bridge leg 110.

The DC source 130 provides DC voltage $V_{dc}$, the control circuit of the inverter 100 uses an unipolar modulation, and the a control method of controlling aforesaid inverter includes steps of: synchronously turning on or off the first switch (S1), second switch (S2), ninth switch (S9) and tenth switch (S10); controlling that the eighth switch (S8) is turning on or off in complementary with the first switch (S1), second switch (S2), ninth switch (S9) and tenth switch (S10); synchronously turning on or off the fourth switch (S4), fifth switch (S5), sixth switch (S6) and seventh switch (S7), and controlling that the third switch (S3) is turning on or off in complementary with the fourth switch (S4), fifth switch (S5), sixth switch (S6) and seventh switch (S7). Thus, these switches are symmetrically selected so that the sum of voltage potentials of the first common coupling point (a) and second common coupling point (b) is with low common mode voltage. Therefore, the inverter 100 of FIG. 1 can be adapted in grid-connected photovoltaic systems that have no isolation transformer, or other similar applications.

In one embodiment, the first to tenth switches (S1)-(S10) are transistors, such as N channel metal-oxide-semiconductor field effect transistors; the first to fourth diodes (D1)-(D4) may be fast recovery diodes having good reverse recovery characteristics and/or silicon carbide diodes. Structurally, the first switch (S1) and the second switch (S2) are connected in anti-series, and the first diode (D1) is connected in anti-parallel with the first switch (S1) and second switch (S2). The fourth switch (S4) and the fifth switch (S5) are connected in anti-series, and the second diode (D2) is connected in anti-parallel with the fourth switch (S4) and fifth switch (S5). The sixth switch (S6) and the seventh switch (S7) are connected in anti-series, and the third diode (D3) is connected in anti-parallel with the sixth switch (S6) and seventh switch (S7). The ninth switch (S9) and the tenth switch (S10) are connected in anti-series, and the fourth diode (D4) is connected in anti-parallel with the ninth switch (S9) and tenth switch (S10).

Specifically, as shown in FIG. 1, the source electrode of the first switch (S1) is connected to the source electrode of the second switch (S2), the cathode of the first diode (D1) is connected to the drain electrode of the first switch (S1), and the anode of the first diode (D1) is connected to the drain electrode of the second switch (S2). The source electrode of the fourth switch (S4) is connected to the source electrode of the fifth switch (S5), the cathode of the second diode (D2) is connected to the drain electrode of the fourth switch (S4), and the anode of the second diode (D2) is connected to the drain electrode of the fifth switch (S5). The source electrode of the sixth switch (S6) is connected to the source electrode of the seventh switch (S7), the cathode of the third diode (D3) is connected to the drain electrode of the sixth switch (S6), and the anode of the third diode (D3) is connected to the drain electrode of the seventh switch (S7). The source electrode of the ninth switch (S9) is connected to the source electrode of the tenth switch (S10), the cathode of the fourth diode (D4) is connected to the drain electrode of the ninth switch (S9), and the anode of the fourth diode (D4) is connected to the drain electrode of the tenth switch (S10).

The first switch (S1) and the second switch (S2) can be swapped over; thus, the drain electrode of the first switch (S1) is connected to the drain electrode of the second switch (S2), the cathode of the first diode (D1) is connected to the source electrode of the first switch (S1), and the anode of the first diode (D1) is connected to the drain electrode of the second switch (S2). Similarly, the fourth switch (S4) and the fifth switch (S5) can be swapped over, the sixth switch (S6) and the seventh switch (S7) can be swapped over, the ninth switch (S9) and the tenth switch (S10) can be swapped over, and their swapping manner is substantially the same as the way of swapping the first switch (S1) and the second switch (S2), and thus, are not repeated herein.

Moreover, in FIG. 1, the first common coupling point (a) is connected to a first inductor (La), the second common coupling point (b) is connected to a second inductor (Lb), and the first inductor (La) and the second inductor (Lb) are connected to an filter 140. The output of the filter 140 serves as an output terminal of the inverter 100 and is connected to the power grid. The filter 140 can reduce an electromagnetic interference noise generated by the inverter 100, so as to avoid adversely affect to other devices from the noise through the power grid.

Figure 2:
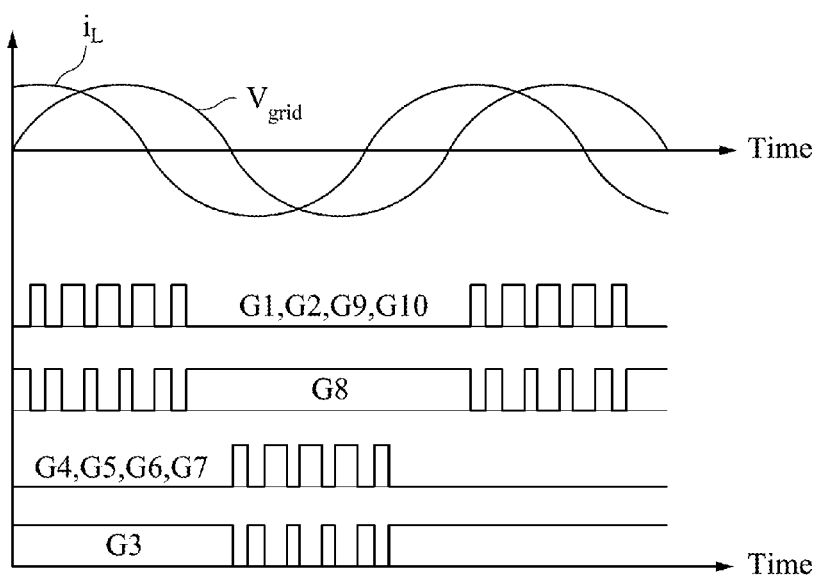
FIG. 2 is a waveform of voltage, current and control signals of the inverter of FIG. 1 according to one exemplary embodiment of the present disclosure.

FIG. 2 is a diagram illustrating the grid voltage $v_{grid}$ (i.e., the voltage of output terminal of the inverter), the inductor current $i_L$ and control signals. As shown in FIG. 2, control signals (G1), (G2), (G9) and (G10) respectively for the first switch (S1), the second switch (S2), the ninth switch (S9) and the tenth switch, (S10) are complementary to a control signal (G8) for the eighth switch (S8); control signals (G4), (G5), (G6) and (G7) respectively for the fourth switch (S4), the fifth switch (S5), the sixth switch (S6) and the seventh switch (S7) are complementary to a control signal (G3) for the third switch (S3).

The control circuit may control the inverter according to the control method as shown in FIG. 2. The control method executed by the control circuit for controlling the inverter includes eight operating modes. For a more complete understanding of the eight operating modes, and the advantages thereof, please refer to FIGS. 3-10 below.

Figure 3:
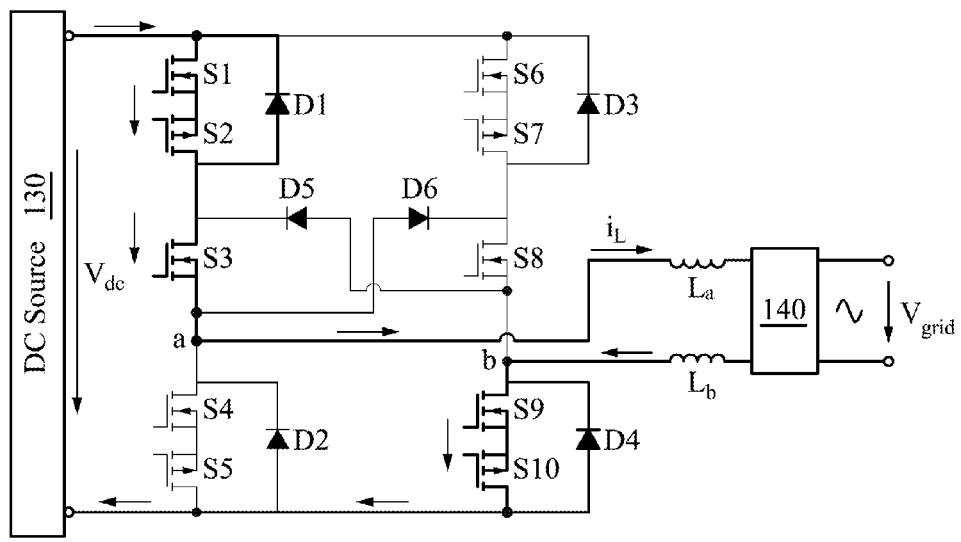
FIG. 3 is a schematic diagram illustrating an inverter in a first operating mode.

Referring to FIG. 3, in the first operating mode, the control method further includes a step of: uninterruptedly turning on the third switch (S3), uninterruptedly turning off the fourth switch (S4), the fifth switch (S5), the sixth switch (S6) and the seventh switch (S7), and synchronously turning on or off the first switch (S1), the second switch (S2), the ninth switch (S9) and the tenth switch (S10), wherein the first switch (S1), the second switch (S2), the ninth switch (S9) and the tenth switch (S10) is turning on or off in complementary with the eighth switch (S8); after the first switch (S1), the second switch (S2), the ninth switch (S9) and the tenth switch (S10) are turned on, the DC source 130 charges the first inductor (La) and the second inductor (Lb), so that the inductor current $i_L$ of the first inductor (La) and a voltage of the output terminal of the inverter 100 (e.g., grid voltage $v_{grid}$ of the output terminal of filter 140) are positive values.

Figure 4:
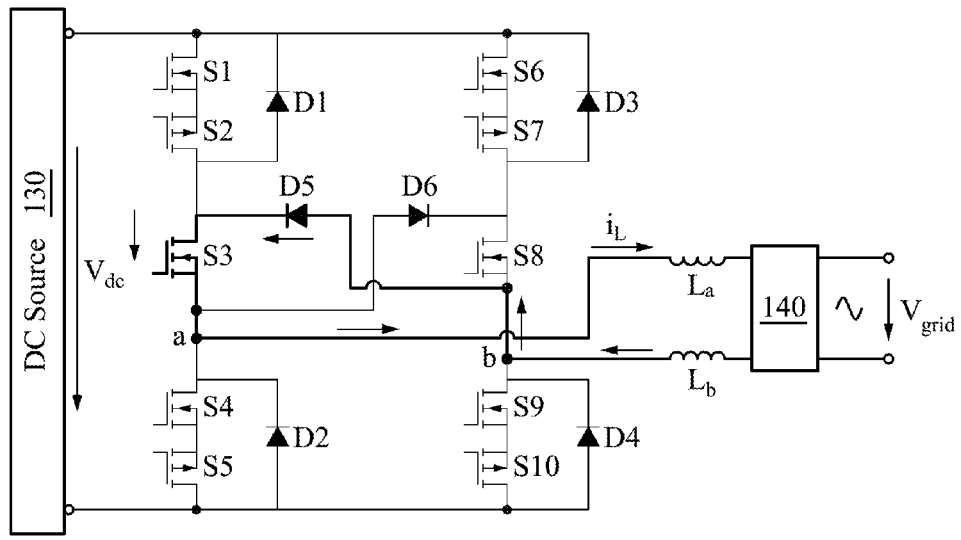
FIG. 4 is a schematic diagram illustrating the inverter of FIG. 1 in a second operating mode.

Referring to FIG. 4, in the second operation mode, the control method further includes a step of: uninterruptedly turning on the third switch (S3), uninterruptedly turning off the fourth switch (S4), the fifth switch (S5), the sixth switch (S6) and the seventh switch (S7), and synchronously turning on or off the first switch (S1), the second switch (S2), the ninth switch (S9) and the tenth switch (S10), wherein the first switch (S1), the second switch (S2), the ninth switch (S9) and the tenth switch (S10) is turning on or off in complementary with the eighth switch (S8); after the first switch (S1), the second switch (S2), the ninth switch (S9) and the tenth switch (S10) are turned off, when the eighth switch (S8) is not turned on, a freewheeling current path for the first inductor (La) and the second inductor (Lb) passes through the third switch (S3) and the fifth diode (D5); in the freewheeling state, after dead time is over, i.e., after the eighth switch (S8) is turned on, no current go through the eighth switch (S8) as shown in FIG. 4, so that the inductor current $i_L$ of the first inductor (La) and a voltage of the output terminal of the inverter 100 (e.g., grid voltage $v_{grid}$ of the output terminal of filter 140) are positive values.

It should be noted that the control circuit of the switchmode power supply performs switching function with the "dead time" feature so as to avoid that multiple switches are synchronously turned on to generate current surge. For example, in the second operation mode, after the first switch (S1), the second switch (S2), the ninth switch (S9) and the tenth switch (S10) are turned off, the eighth switch (S8) is still not turned on during a time period, and this time period is the "dead time" in the second operation mode.

Figure 5:
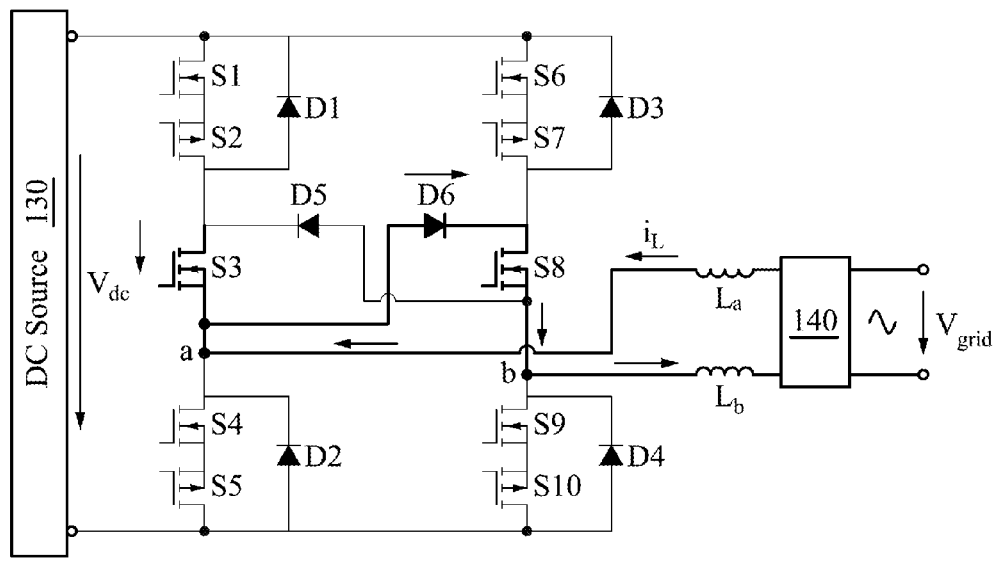
FIG. 5 is a schematic diagram illustrating the inverter of FIG. 1 in a third operating mode.

Referring to FIG. 5, in the third operating mode, the control method further includes a step of: uninterruptedly turning on the third switch (S3), uninterruptedly turning off the fourth switch (S4), the fifth switch (S5), the sixth switch (S6) and the seventh switch (S7), and synchronously turning on or off the first switch (S1), the second switch (S2), the ninth switch (S9) and the tenth switch (S10), wherein the first switch (S1), the second switch (S2), the ninth switch (S9) and the tenth switch (S10) is turning on or off in complementary with the eighth switch (S8); after the eighth switch (S8) is turned on, a voltage of the output terminal of the inverter 100 (e.g., grid voltage $v_{grid}$ of the output terminal of filter 140) charges the first inductor (La) and second inductor (Lb) through the sixth diode (D6) and the eighth switch (S8), and no current go through the third switch (S3) that is turned on, so that the voltage of the output terminal of the inverter 100 (e.g., grid voltage $v_{grid}$ of the output terminal of filter 140) is a positive value, and the inductor current $i_L$ of the first inductor (La) is a negative value.

Figure 6:
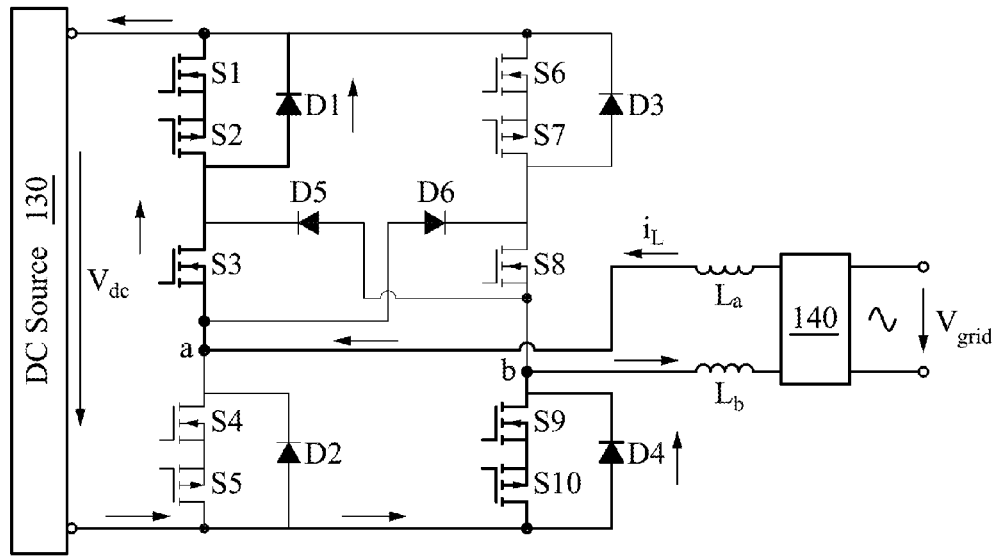
FIG. 6 is a schematic diagram illustrating the inverter of FIG. 1 in a fourth operating mode.

Referring to FIG. 6, in the fourth operating mode, the control method further includes a step of: uninterruptedly turning on the third switch (S3), turning off the fourth switch (S4), the fifth switch (S5), the sixth switch (S6) and the seventh switch (S7), and synchronously turning on or off the first switch (S1), the second switch (S2), the ninth switch (S9) and the tenth switch (S10), wherein the first switch (S1), the second switch (S2), the ninth switch (S9) and the tenth switch (S10) is turning on or off in complementary with the eighth switch (S8); after the eighth switch (S8) is turned off, when the first switch (S1), the second switch (S2), the ninth switch (S9) and the tenth switch (S10) are still not turned on, the freewheeling current of the first inductor (La) and second inductor (Lb) go through the first diode (D1), the third switch (S3) and the fourth diode (D4) because of the blocking effect of the second switch (S2) and the tenth switch (S10); after the dead time, when the first switch (S1), the second switch (S2), the ninth switch (S9) and the tenth switch (S10) are turned on synchronously, the freewheeling current of the first inductor (La) and second inductor (Lb) go through the first switch (S1), second switch (S2), ninth switch (S9) and tenth switch (S10), so that the voltage of the output terminal of the inverter 100 (e.g., grid voltage $v_{grid}$ of the output terminal of filter 140) is a positive value, and the inductor current $i_L$ of the first inductor (La) is a negative value.

It should be noted that the dead time in the fourth operation mode is a time period during which the first switch (S1), the second switch (S2), the ninth switch (S9) and the tenth switch (S10) are still not turned on after the eighth switch (S8) is turned off. During the dead time, a body diode of the second switch (S2) and a body diode of the first switch (S1) are connected in anti-series, and a body diode of the ninth switch (S9) and a body diode of the tenth switch (S10) are connected in anti-series; therefore, the freewheeling current cannot flow through the body diodes of the first switch (S1) and ninth switch (S9) and go through the first diode (D1) and the fourth diode (D4). Because the body diode of MOSFET has poor reverse recovery characteristics, when the current go through the body diode of the MOSFET, it may cause the failure of the MOSFET during the reverse recovery process. However, freewheeling current of aforesaid inverter 100 cannot go through the body diodes of the MOSFETs but go through the external anti-paralleled diodes, here as the first diode (D1), the second diode (D2), the third diode (D3) and the fourth diode (D4), connected in parallel with the MOSFETs. Furthermore, the diodes may be fast recovery diodes having good reverse recovery characteristics and/or silicon carbide diodes so as to avoid aforesaid serious influence. Therefore, the efficiency of the inverter can be improved, and the presented inverter can also have ability to provide reactive power.

Figure 7:
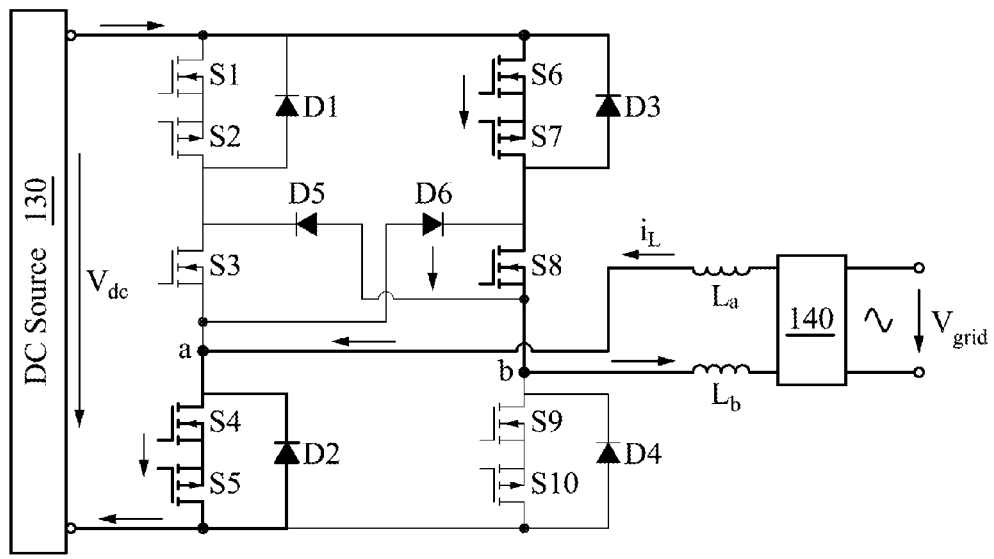
FIG. 7 is a schematic diagram illustrating the inverter of FIG. 1 in a fifth operating mode.

Referring to FIG. 7, in the fifth operating mode, the control method further includes a step of: uninterruptedly turning on the eighth switch (S8), uninterruptedly turning off the first switch (S1), the second switch (S2), the ninth switch (S9) and the tenth switch (S10), and synchronously turning on or off the fourth switch (S4), the fifth switch (S5), the sixth switch (S6) and the seventh switch (S7), wherein the fourth switch (S4), the fifth switch (S5), the sixth switch (S6) and the seventh switch (S7) is turning on or off in complementary with the third switch (S3); after the fourth switch (S4), the fifth switch (S5), the sixth switch (S6) and the seventh switch (S7) are turned on, the DC source 130 reversely charges the first inductor (La) and second inductor (Lb), so that the inductor current $i_L$ of the first inductor (La) and a voltage of the output terminal of the inverter 100 (e.g., grid voltage $v_{grid}$ of the output terminal of filter 140) are negative values.

Figure 8:
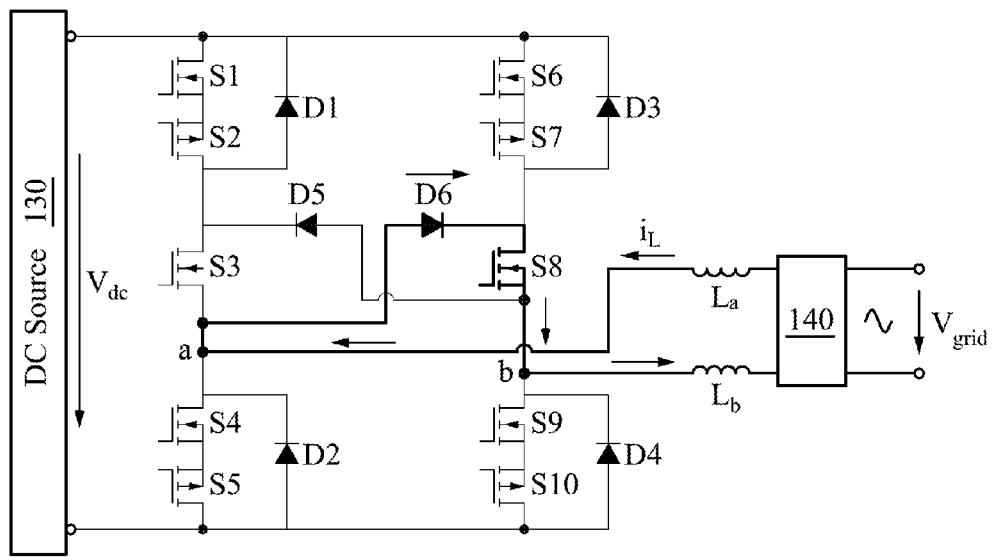
FIG. 8 is a schematic diagram illustrating the inverter of FIG. 1 in a sixth operating mode.

Referring to FIG. 8, in the sixth operating mode, the control method further includes a step of: uninterruptedly turning on the eighth switch (S8), uninterruptedly turning off the first switch (S1), the second switch (S2), the ninth switch (S9) and the tenth switch (S10), and synchronously turning on or off the fourth switch (S4), the fifth switch (S5), the sixth switch (S6) and the seventh switch (S7), wherein the fourth switch (S4), the fifth switch (S5), the sixth switch (S6) and the seventh switch (S7) is turning on or off in complementary with the third switch (S3); after the fourth switch (S4), the fifth switch (S5), the sixth switch (S6) and the seventh switch (S7) are turned off, the when the third switch (S3) is not turned on, a freewheeling current path for the first inductor (La) and the second inductor (Lb) passes through the eighth switch (S8) and the sixth diode (D6); in the freewheeling state, after the dead time is over, i.e., after the third switch (S3) is turned on, no current go through the third switch (S3), so that the inductor current $i_L$ of the first inductor (La) and a voltage of the output terminal of the inverter 100 (e.g., grid voltage $v_{grid}$ of the output terminal of filter 140) are negative values. In the sixth working mode, the dead time is a time period during which the third switch (S3) is not turned on after the fourth switch (S4), the fifth switch (S5), the sixth switch (S6) and the seventh switch (S7) are turned off.

Figure 9:
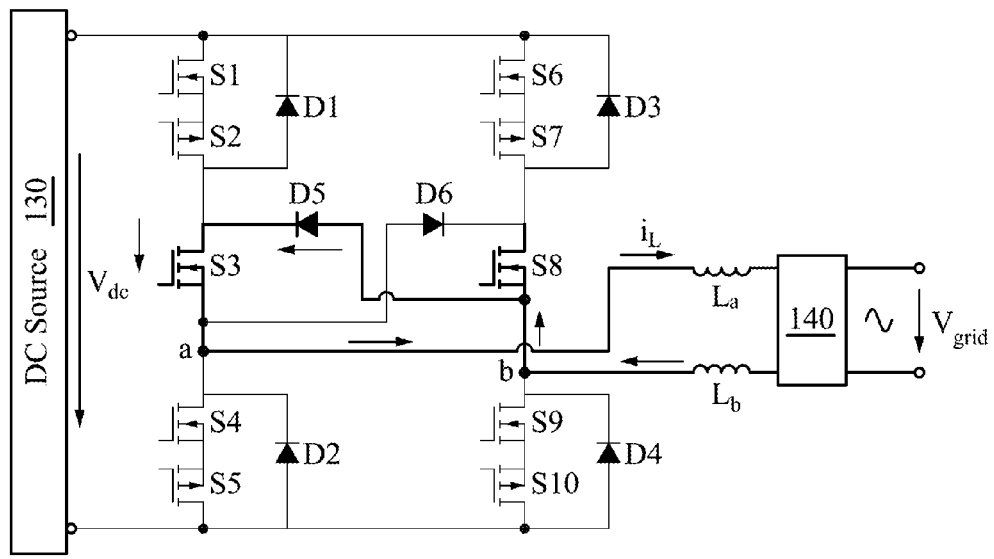
FIG. 9 is a schematic diagram illustrating the inverter of FIG. 1 in a seventh operating mode.

Referring to FIG. 9, in the seventh operating mode, the control method further includes a step of: uninterruptedly turning on the eighth switch (S8), uninterruptedly turning off the first switch (S1), the second switch (S2), the ninth switch (S9) and the tenth switch (S10), and synchronously turning on or off the fourth switch (S4), the fifth switch (S5), the sixth switch (S6) and the seventh switch (S7), wherein the fourth switch (S4), the fifth switch (S5), the sixth switch (S6) and the seventh switch (S7) is turning on or off in complementary with the third switch (S3); after the third switch (S3) is turned on, a voltage of an output terminal of the inverter 100 (e.g., grid voltage $v_{grid}$ of the output terminal of filter 140) charges the first inductor (La) and the second inductor (Lb) through the fifth diode (D5) and the third switch (S3), and no current go through the eighth switch (S8) that is turned on, so that the voltage of the output terminal of the inverter 100 (e.g., grid voltage $v_{grid}$ of the output terminal of filter 140) is a negative value, and the inductor current $i_L$ of the first inductor (La) is a positive value.

Figure 10:
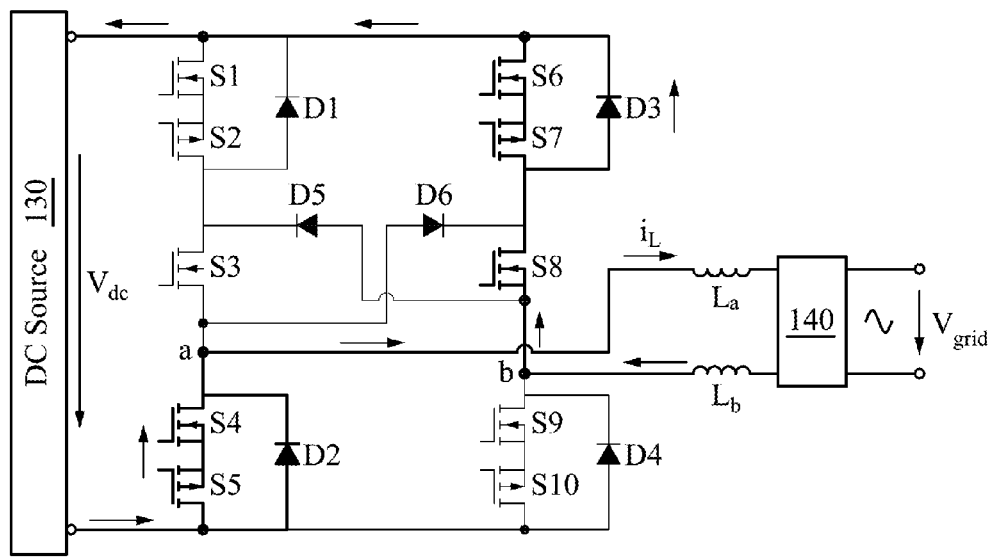
FIG. 10 is a schematic diagram illustrating the inverter of FIG. 1 in a eighth operating mode.

Referring to FIG. 10, in the eighth operating mode, the control method further includes a step of: uninterruptedly turning on the eighth switch (S8), uninterruptedly turning off the first switch (S1), the second switch (S2), the ninth switch (S9) and the tenth switch (S10), and synchronously turning on or off the fourth switch (S4), the fifth switch (S5), the sixth switch (S6) and the seventh switch (S7), wherein the fourth switch (S4), the fifth switch (S5), the sixth switch (S6) and the seventh switch (S7) is turning on or off in complementary with the third switch (S3); after the third switch (S3) is turned off, when the fourth switch (S4), the fifth switch (S5), the sixth switch (S6) and the seventh switch (S7) are not turned on, a freewheeling current of the first inductor (La) and the second inductor (Lb) go through the second diode (D2), the eighth switch (S8) and the third diode (D3) because of the blocking effect of the seventh switch (S7) and the fifth switch (S5); after the dead time, when the fourth switch (S4), the fifth switch (S5), the sixth switch (S6) and the seventh switch (S7) are turned on synchronously, the freewheeling current of the first and second inductors go through the fourth switch (S4), the fifth switch (S5), the sixth switch (S6) and the seventh switch (S7), so that the voltage of the output terminal of the inverter 100 (e.g., grid voltage $v_{grid}$ of the output terminal of filter 140) is a negative value, and the inductor current $i_L$ of the first inductor (La) is a positive value.

It should be noted that the dead time in the eighth operation mode is a time period during which the fourth switch (S4), the fifth switch (S5), the sixth switch (S6) and the seventh switch (S7) are still not turned on after the third switch (S3) is turned off. During the dead time, a body diode of the fifth switch (S5) and a body diode of the fourth switch (S4) are connected in anti-series, and a body diode of the seventh switch (S7) and a body diode of the sixth switch (S6) are connected in anti-series; the freewheeling current cannot flow through the body diodes of the fourth switch (S4) and the sixth switch (S6) and go through the second diode (D2) and the third diode (D3), so as to avoid the serious influence that results from the poor reverse recovery characteristics of the body diode of MOSFET. Therefore, the non-isolated inverter may also have ability to provide reactive power.

In the first, fourth, fifth and eighth operating modes, sum of voltage potentials of the first and second common coupling points (a) and (b) is $V_{dc}$; in the second, third, sixth and seventh operating modes, the first common coupling point (a) and second common coupling point (b) are electrically in a "floating" state, and their voltage potentials are clamped by the capacitor and other switches. Each of the voltage potentials of the first common coupling point (a) and the second common coupling point (b) can be $V_{dc}/2$ by properly selecting switches and maintaining the symmetry. In other words, the sum of voltage potentials of the first common coupling point and the second common coupling point may be remain as Vdc by symmetrically selecting switches, so that the inverter of FIG. 1 can be adapted in non-isolated photovoltaic systems. In addition, when the non-isolated inverter of the present invention operating in freewheeling states, the freewheeling current does not pass through the body diodes of the transistors and passes through the external diodes that are connected in parallel with the transistors, so as to avoid the serious influence that results from the poor reverse recovery characteristics of the body diodes of MOSFET. Therefore, aforesaid non-isolated inverter can provide active power (e.g., first, second, fifth and sixth operating modes), and can also provide reactive power (e.g., third, fourth, seventh, eighth operating modes).

Figure 11:
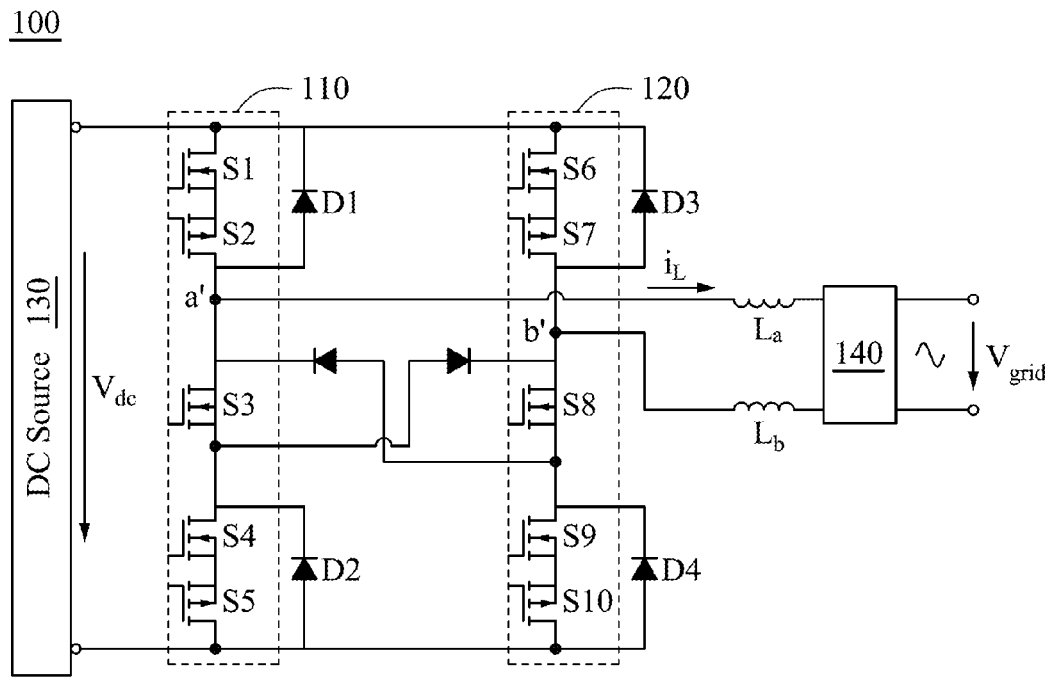
FIG. 11 is a schematic diagram of an inverter according to another embodiment of the present disclosure.

In another aspect, FIG. 11 is a circuit diagram of an inverter 200 according to another embodiment of the present disclosure. The differences between the inverter 100 of FIG. 1 and the inverter 200 of FIG. 11 are the changes of the position of the common coupling points. As illustrated in FIG. 11, the connection point between the second switch (S2) and third switch (S3) serves as a first common coupling point (a'); the connection point between the seventh switch (S7) and the eighth switch (S8) serves as a second common coupling point (b').

The DC source 130 provides DC voltage $V_{dc}$, the control circuit of the inverter 200 uses an unipolar modulation, and the a control method of controlling aforesaid inverter includes steps of: synchronously turning on or off the first switch (S1), the second switch (S2), the ninth switch (S9) and the tenth switch (S10), controlling that the third switch (S3) is turning on or off in complementary with the first switch (S1), the second switch (S2), the ninth switch (S9) and the tenth switch (S10), synchronously turning on or off the fourth switch (S4), the fifth switch (S5), the sixth switch (S6) and the seventh switch (S7), and controlling that the eighth switch (S8) is turning on or off in complementary with the fourth switch (S4), the fifth switch (S5), the sixth switch (S6) and the seventh switch (S7). Thus, these switches are symmetrically selected so that the sum of voltage potentials of the first point (a) and second common coupling point (b) is with low common mode voltage.

Figure 12:
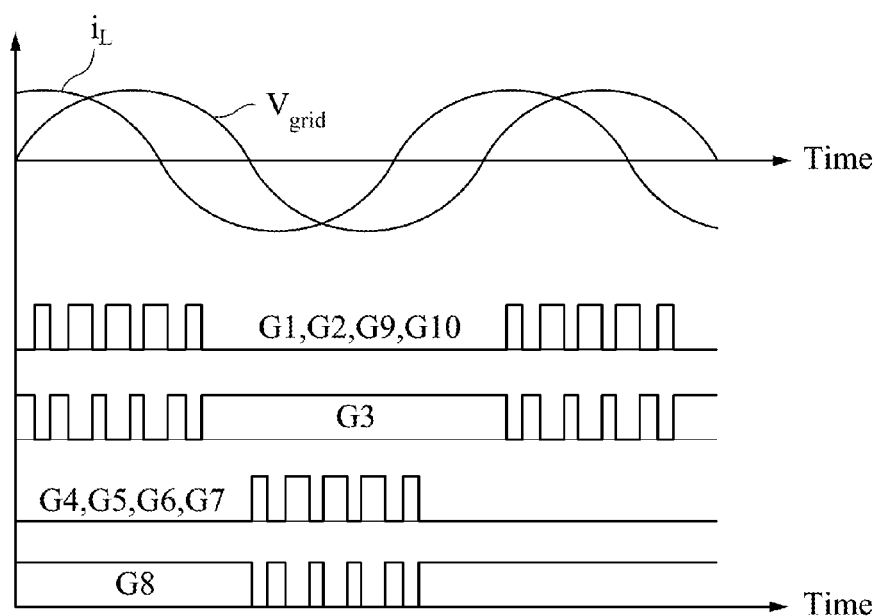
FIG. 12 is a waveform of voltage, current and control signals of the inverter of FIG. 11 according to one exemplary embodiment of the present disclosure.

Specifically, FIG. 12 is a waveform illustrating the grid voltage $v_{grid}$ of the inverter 200 of FIG. 11 (i.e., the voltage of output terminal of the inverter), the inductor current $i_L$ and control signals (G1)~(G10). As shown in FIG. 12, control signals (G1), (G2), (G9) and (G10) respectively for the first switch (S1), the second switch (S2), the ninth switch (S9) and the tenth switch (S10) is complementary to a control signal (G3) for the third switch (S3); control signals (G4), (G5), (G6) and (G7) respectively for the fourth switch (S4), the fifth switch (S5), the sixth switch (S6) and the seventh switch (S7) is complementary to a control signal (G8) for the eighth switch (S8). Thus, the inverter 200 outputs alternating current. In this way, the control method not only provides active power output but also controls reactive power output.

The control circuit may control the inverter 200 according to the control method as shown in FIG. 12. The control method executed by the control circuit for controlling the inverter includes eight operating modes. The eight operating modes of the inverter 200 is similar to the eight operating modes of the inverter 100, in which the difference is that an on/off operation of the third switch (S3) and an on/off operation of the eighth switch (S8) are swapped over, and thus, are not repeated herein.

In summary, a control method of controlling aforesaid inverter includes steps of: synchronously turning on or off the first switch (S1), the second switch (S2), the ninth switch (S9) and the tenth switch (S10), and controlling that the eighth switch (S8) is turning on or off in complementary with the first switch (S1), the second switch (S2), the ninth switch (S9) and the tenth switch (S10); synchronously turning on or off the fourth switch (S4), the fifth switch (S5), the sixth switch (S6) and the seventh switch (S7); controlling that the third switch (S3) is turning on or off in complementary with the fourth switch (S4), the fifth switch (S5), the sixth switch (S6) and the seventh switch (S7). Alternatively, the control method includes following steps: synchronously turning on or off the first switch (S1), the second switch (S2), the ninth switch (S9) and the tenth switch (S10), and controlling that the third switch (S3) is turning on or off in complementary with the first switch (S1), the second switch (S2), the ninth switch (S9) and the tenth switch (S10); synchronously turning on or off the fourth switch (S4), the fifth switch (S5), the sixth switch (S6) and the seventh switch (S7); controlling that the eighth switch (S8) is turning on or off in complementary with the fourth switch (S4), the fifth switch (S5), the sixth switch (S6) and the seventh switch (S7).

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

What is claimed is:

1. An inverter, comprising:
   a first bridge leg electrically connected to a direct-current (DC) source, the first bridge leg comprising a first switch, a second switch, a third switch and a fourth switch and a fifth switch which are sequentially connected in series;
   a second bridge leg connected to the first bridge leg in parallel, the second bridge leg comprising a sixth switch, a seventh switch, an eighth switch, a ninth switch and a tenth switch which are sequentially connected in series;
   a first diode connected in anti-parallel with the first switch and the second switch which are connected in series;
   a second diode connected in anti-parallel with the fourth switch and the fifth switch which are connected in series;
   a third diode connected in anti-parallel with the sixth switch and the seventh switch which are connected in series;
   a fourth diode connected in anti-parallel with the ninth switch and the tenth switch which are connected in series;
   a cathode of a fifth diode connected to a connection point between the second switch and the third switch and an anode of the fifth diode connected to a connection point between the eighth switch and the ninth switch; and
   a cathode of a sixth diode connected to a connection point between the seventh switch and the eighth switch and an anode of the sixth diode connected to a connection point between the third switch and the fourth switch.

2. The inverter of claim 1, wherein the first switch and the second switch are connected in anti-series, the fourth switch and the fifth switch are connected in anti-series, the sixth switch and the seventh switch are connected in anti-series, and the ninth switch and the tenth switch are connected in anti-series.

3. The inverter of claim 1, wherein each of the first switch, the second switch, the third switch, the fourth switch, the fifth switch, the sixth switch, seventh switch, the eighth switch, the ninth switch and the tenth switch is a metal-oxide-semiconductor field effect transistor.

4. The inverter of claim 1, wherein each of the first diode, the second diode, the third diode and the fourth diode is a fast recovery diode or a silicon carbide diode.

5. The inverter of claim 1, wherein the DC source is a photovoltaic array.

6. The inverter of claim 1, wherein the connection point between the third switch and the fourth switch serves as a first common coupling point; the connection point between the eighth switch and the ninth switch serves as a second common coupling point.

7. The inverter of claim 1, wherein the connection point between the second switch and the third switch serves as a first common coupling point; the connection point between the seventh switch and the eighth switch serves as a second common coupling point.

8. The inverter of claim 7, wherein the first common coupling point is connected to a first inductor; the second common coupling point is connected to a second inductor.

9. The inverter of claim 8, wherein the first inductor and the second inductor are connected to an filter.

10. A control method of controlling the inverter of claim 1, the control method comprising:
synchronously turning on or off the first switch, the second switch, the ninth switch and the tenth switch, and controlling that the eighth switch is turning on or off in complementary with the first switch, the second switch, the ninth switch and the tenth switch;
synchronously turning on or off the fourth switch, the fifth switch, the sixth switch and the seventh switch;
controlling that the third switch is turning on or off in complementary with the fourth switch, the fifth switch, the sixth switch and the seventh switch.

11. The control method of claim 10, wherein the connection point between the third switch and the fourth switch serves as a first common coupling point, and the connection point between the eighth switch and the ninth switch serves as a second common coupling point.

12. The control method of claim 11, the first common coupling point connected to a first inductor, the second common coupling point connected to a second inductor, and the control method further comprising:
uninterruptedly turning on the third switch, and synchronously turning on or off the first switch, the second switch, the ninth switch and the tenth switch, wherein the first switch, the second switch, the ninth switch and the tenth switch is turning on or off in complementary with the eighth switch, and after the first switch, the second switch, the ninth switch and the tenth switch are turned on, the DC source charges first inductor and the second inductor, so that an inductor current of the first inductor and a voltage of an output terminal of the inverter are positive values.

13. The control method of claim 11, the first common coupling point connected to a first inductor, the second common coupling point connected to a second inductor, and the control method further comprising:
uninterruptedly turning on the third switch, and synchronously turning on or off the first switch, the second switch, the ninth switch and the tenth switch, wherein the first switch, the second switch, the ninth switch and the tenth switch is turning on or off in complementary with the eighth switch, wherein after the first switch, the second switch, the ninth switch and the tenth switch are turned off, when the eighth switch is not turned on, a freewheeling current path for the first inductor and the second inductor passes through the third switch and the fifth diode, wherein after the eighth switch is turned on, no current go through the eighth switch, so that an inductor current of the first inductor and a voltage of an output terminal of the inverter are positive values.

14. The control method of claim 11, the first common coupling point connected to a first inductor, the second common coupling point connected to a second inductor, and the control method further comprising:
uninterruptedly turning on the third switch, and synchronously turning on or off the first switch, the second switch, the ninth switch and the tenth switch, wherein the first switch, the second switch, the ninth switch and the tenth switch is turning on or off in complementary with the eighth switch, wherein after the eighth switch is turned on, a voltage of an output terminal of the inverter charges the first inductor and the second inductor through the sixth diode and the eighth switch, and no current go through the third switch that is turned on, so that the voltage of the output terminal of the inverter is a positive value, and an inductor current of the first inductor is a negative value.

15. The control method of claim 11, the first common coupling point connected to a first inductor, the second common coupling point connected to a second inductor, and the control method further comprising:
uninterruptedly turning on the third switch, and synchronously turning on or off the first switch, the second switch, the ninth switch and the tenth switch, wherein the first switch, the second switch, the ninth switch and the tenth switch is turning on or off in complementary with the eighth switch, wherein after the eighth switch is turned off, when the first switch, the second switch, the ninth switch and the tenth switch are not turned on, a freewheeling current of the first inductor and the second inductor go through the first diode, the third switch and the fourth diode, wherein when the first switch, the second switch, the ninth switch and the tenth switch are turned on synchronously, the freewheeling current of the first inductor and the second inductor go through the first switch, the second switch, the ninth switch and the tenth switch, so that a voltage of an output terminal of the inverter is a positive value, and an inductor current of the first inductor is a negative value.

16. The control method of claim 11, the first common coupling point connected to a first inductor, the second common coupling point connected to a second inductor, and the control method further comprising:
uninterruptedly turning on the eighth switch, and synchronously turning on or off the fourth switch, the fifth switch, the sixth switch and the seventh switch, wherein the fourth switch, the fifth switch, the sixth switch and the seventh switch is turning on or off in complementary with the third switch, wherein after the fourth switch, the fifth switch, the sixth switch and the seventh switch are turned on, the DC source charges the first inductor and the second inductor, so that an inductor current of the first inductor and a voltage of an output terminal of the inverter are negative values.

17. The control method of claim 11, the first common coupling point connected to a first inductor, the second common coupling point connected to a second inductor, and the control method further comprising:
uninterruptedly turning on the eighth switch, and synchronously turning on or off the fourth switch, the fifth switch, the sixth switch and the seventh switch, wherein the fourth switch, the fifth switch, the sixth switch and the seventh switch is turning on or off in complementary with the third switch, wherein after the fourth switch, the fifth switch, the sixth switch and the seventh switch are turned off, when the third switch is not turned on, a freewheeling current path for the first inductor and the second inductor passes through the eighth switch and the sixth diode, wherein after the third switch is turned on, no current go through the third switch, so that an inductor current of the first inductor and a voltage of an output terminal of the inverter are negative values.

18. The control method of claim 11, the first common coupling point connected to a first inductor, the second common coupling point connected to a second inductor, and the control method further comprising:
uninterruptedly turning on the eighth switch, and synchronously turning on or off the fourth switch, the fifth switch, the sixth switch and the seventh switch, wherein the fourth switch, the fifth switch, the sixth switch and the seventh switch is turning on or off in complementary with the third switch, wherein after the third switch is turned on, a voltage of an output terminal of the inverter charges the first inductor and the second inductor through the fifth diode and the third switch, and on current go through the eighth switch that is turned on, so that the voltage of the output terminal of the inverter is a negative value, and an inductor current of the first inductor is a positive value.

19. The control method of claim 11, the first common coupling point connected to a first inductor, the second common coupling point connected to a second inductor, and the control method further comprising:

uninterruptedly turning on the eighth switch, and synchronously turning on or off the fourth switch, the fifth switch, the sixth switch and the seventh switch, wherein the fourth switch, the fifth switch, the sixth switch and the seventh switch is turning on or off in complementary with the third switch, wherein after the third switch is turned off, when the fourth switch, the fifth switch, the sixth switch and the seventh switch are not turned on, a freewheeling current of the first inductor and the second inductor go through the second diode, the eighth switch and the third diode, wherein after the fourth switch, the fifth switch, the sixth switch and the seventh switch are turned on synchronously, the freewheeling current of the first inductor and the second inductor go through the fourth switch, the fifth switch, the sixth switch and the seventh switch, so that a voltage of an output terminal of the inverter is a negative value, and an inductor current of the first inductor is a positive value.

20. A control method of controlling the inverter of claim 1, the control method comprising:

synchronously turning on or off the first switch, the second switch, the ninth switch and the tenth switch, and controlling that the third switch is turning on or off in complementary with the first switch, the second switch, the ninth switch and the tenth switch;

synchronously turning on or off the fourth switch, the fifth switch, the sixth switch and the seventh switch;

controlling that the eighth switch is turning on or off in complementary with the fourth switch, the fifth switch, the sixth switch and the seventh switch.

21. The control method of claim 20, wherein the connection point between the second switch and the third switch serves as a first common coupling point, and the connection point between the seventh switch and the eighth switch serves as a second common coupling point.

* * * * *